United States Patent
Akaike et al.

(10) Patent No.: US 11,542,381 B2
(45) Date of Patent: Jan. 3, 2023

(54) SILVER-COATED RESIN PARTICLE

(71) Applicants: MITSUBISHI MATERIALS CORPORATION, Tokyo (JP); Mitsubishi Materials Electronic Chemicals Co., Ltd., Akita (JP)

(72) Inventors: Hiroto Akaike, Naka-gun (JP); Kazuhiko Yamasaki, Naka-gun (JP); Kensuke Kageyama, Akita (JP); Hirokazu Tsukada, Akita (JP)

(73) Assignees: Mitsubishi Materials Corporation, Tokyo (JP); Mitsubishi Materials Electronic Chemicals Co., Ltd., Akita (JP)

( * ) Notice: Subject to any disclaimer, the term of this patent is extended or adjusted under 35 U.S.C. 154(b) by 179 days.

(21) Appl. No.: 16/959,552

(22) PCT Filed: Jan. 28, 2019

(86) PCT No.: PCT/JP2019/002636
§ 371 (c)(1),
(2) Date: Jul. 1, 2020

(87) PCT Pub. No.: WO2019/155924
PCT Pub. Date: Aug. 15, 2019

(65) Prior Publication Data
US 2021/0363322 A1    Nov. 25, 2021

(30) Foreign Application Priority Data
Feb. 6, 2018 (JP) .............. JP2018-019519

(51) Int. Cl.
*C08K 3/08* (2006.01)
*C23C 18/28* (2006.01)
(Continued)

(52) U.S. Cl.
CPC .............. *C08K 3/08* (2013.01); *C23C 18/285* (2013.01); *C23C 18/42* (2013.01); *H01B 1/02* (2013.01); *C08K 2003/0806* (2013.01)

(58) Field of Classification Search
CPC ... H01B 1/02; H01B 5/14; C08K 3/08; C08K 2003/0806; C08J 3/128; C23C 18/42
(Continued)

(56) References Cited

U.S. PATENT DOCUMENTS

2006/0100314 A1    5/2006  Arifuku et al.
2007/0295943 A1*  12/2007  Jun ..................... H05K 3/323
                                                           252/512

FOREIGN PATENT DOCUMENTS

CN    1107234 A    8/1995
CN    1290278 A    4/2001
(Continued)

OTHER PUBLICATIONS

Office Action dated Mar. 3, 2021, issued for Chinese patent application No. 201980006709.3 and English translation thereof.
(Continued)

*Primary Examiner* — Tri V Nguyen
(74) *Attorney, Agent, or Firm* — Locke Lord LLP (57) ABSTRACT

A silver-coated resin particle having a resin particle and a silver coating layer provided on a surface of the resin particle, in which an average value of a 10% compressive elastic modulus is in a range of 500 MPa or more and 15,000 MPa or less and a variation coefficient of the 10% compressive elastic modulus is 30% or less.

5 Claims, 1 Drawing Sheet (51) Int. Cl.
*C23C 18/42* (2006.01)
*H01B 1/02* (2006.01)

(58) Field of Classification Search
USPC .................. 428/407; 252/500, 510, 511, 514
See application file for complete search history.

(56) References Cited

FOREIGN PATENT DOCUMENTS

| | | | |
|---|---|---|---|
| CN | 101065421 A | | 10/2007 |
| CN | 102959641 A | | 3/2013 |
| CN | 106133894 A | | 11/2016 |
| CN | 107112072 A | | 8/2017 |
| CN | 107210090 A | | 9/2017 |
| JP | 08-193186 A | | 7/1996 |
| JP | 2001011503 A | * | 1/2001 |
| JP | 2001216841 A | * | 8/2001 |
| JP | 2004165123 A | * | 6/2004 |
| JP | 2006-040546 A | | 2/2006 |
| JP | 2006040546 A | * | 2/2006 |
| JP | 2012-190795 A | | 10/2012 |
| JP | 2013-118180 A | | 6/2013 |
| JP | 2014-063673 A | | 4/2014 |
| JP | 2014-207193 A | | 10/2014 |
| JP | 2015-176824 A | | 10/2015 |
| JP | 2016094555 A | * | 5/2016 |
| JP | 2016-130354 A | | 7/2016 |
| JP | 2017-113934 A | | 6/2017 |
| JP | 6216474 B1 | | 10/2017 |
| JP | 2018-002916 A | | 1/2018 |
| WO | 2005/002002 A1 | | 1/2005 |

OTHER PUBLICATIONS

Supplementary European Search Report dated Oct. 12, 2021, issued for European Patent Application No. 19750869.0.
International Search Report dated Mar. 12, 2019, issued for PCT/JP2019/002636 and English translation thereof.
Office Action dated Sep. 30, 2022, issued for Korean Patent Application No. 10-2020-7018647 and English translation thereof.

* cited by examiner

SILVER-COATED RESIN PARTICLE

TECHNICAL FIELD

The present invention relates to a silver-coated resin particle having a resin particle and a silver coating layer provided on a surface of this resin particle.

Priority is claimed on Japanese Patent Application No. 2018-019519, filed Feb. 6, 2018, the content of which is incorporated herein by reference.

BACKGROUND ART

A silver-coated resin particle has a similar conductive property to a silver particle, and a resin particle that is a base particle is softer than a silver particle, and thus the silver-coated resin particle has a characteristic of being easily deformed. Therefore, the silver-coated resin particle is used as a conductive filler for a conductive material such as a thermal interface material (TIM) or a conductive spacer. The silver-coated resin particle used as a conductive filler preferably has a high stress relaxation capability so as to prevent a conductive material including the silver-coated resin particle from breaking when a stress is imparted to the conductive material.

Patent Document 1 discloses, as a silver-coated resin particle having a high stress relaxation capability, a silver-coated resin particle in which, as a resin particle that is a base particle, a resin particle having an average particle diameter of 0.1 to 10 μm is used, an amount of silver included in a silver coating layer is set to 60 to 90 parts by mass with respect to 100 parts by mass of the silver-coated resin particle, and a heat generation peak temperature at the time of carrying out a differential thermal analysis on the silver-coated resin particle is set to 265° C. or higher.

CITATION LIST

Patent Literature

[Patent Document 1]
Japanese Unexamined Patent Application, First Publication No. 2016-130354

SUMMARY OF INVENTION

Technical Problem

The silver-coated resin particle described in Patent Document 1 has resistance to a temperature change because the heat generation peak temperature at the time of carrying out a differential thermal analysis is set to 265° C. or higher, but there is a case where the relaxation capability for a physical impact such as a tensile or compressive impact or a stress such as a thermal stress is not sufficient.

The present invention has been made in consideration of the above-described circumstance, and an object of the present invention is to provide a silver-coated resin particle having a high relaxation capability for a stress.

Solution to Problem

[1] In order to solve the above-described problem, a silver-coated resin particle of the present invention is a silver-coated resin particle having a resin particle and a silver coating layer provided on a surface of the resin particle, in which an average value of a 10% compressive elastic modulus is in a range of 500 MPa or more and 15,000 MPa or less, and a variation coefficient of the 10% compressive elastic modulus is 30% or less.

According to the silver-coated resin particle of the present invention configured as described above, the average value of the 10% compressive elastic modulus is in a range of 500 MPa or more and 15,000 MPa or less, the variation coefficient of the 10% compressive elastic modulus is as low as 30% or less, and the variation of the 10% compressive elastic modulus is small, and thus, when a stress is imparted, the silver-coated resin particle deforms uniformly and exhibits a high relaxation capability. Therefore, in a conductive material including the silver-coated resin particle of the present invention, when a stress is imparted, the silver-coated resin particle deforms uniformly, and the stress is relaxed and is not easily concentrated on a specific place, and thus the conductive material does not easily break.

[2] In the [1], as the resin particle, any of a silicone resin particle, an aramid resin particle, a fluororesin particle, a polysulfone resin particle, a polyether resin particle, a polyimide resin particle, a polyamide-imide resin particle, an epoxy resin particle, a phenol resin particle, an acrylic resin particle, an acrylic-styrene copolymer particle, a polyurethane particle, and a resin particle having a core-shell structure may be used.

[3] In the [1] or [2], an average particle diameter of the resin particle is in a range of 0.1 μm or more and 30 μm or less. In a case where the average particle diameter of the resin particle is in this range, the resin particle does not easily agglomerate, a surface area of the resin particle becomes small, it is possible to suppress an amount of silver necessary to obtain a conductive property required as a conductive filler, and a favorable silver coating layer is easily formed. When the silver-coated resin particle of the present invention is used as a conductive filler for a conductive material, it is possible to improve the reliability as long as the average particle diameter is in this range.

Advantageous Effects of Invention

According to the present invention, it becomes possible to provide a silver-coated resin particle having a high relaxation capability for a stress.

DESCRIPTION OF EMBODIMENTS

Hereinafter, an embodiment of the present invention will be described with reference to the accompanying drawings.
[Silver-Coated Resin Particle]

Figure 1:
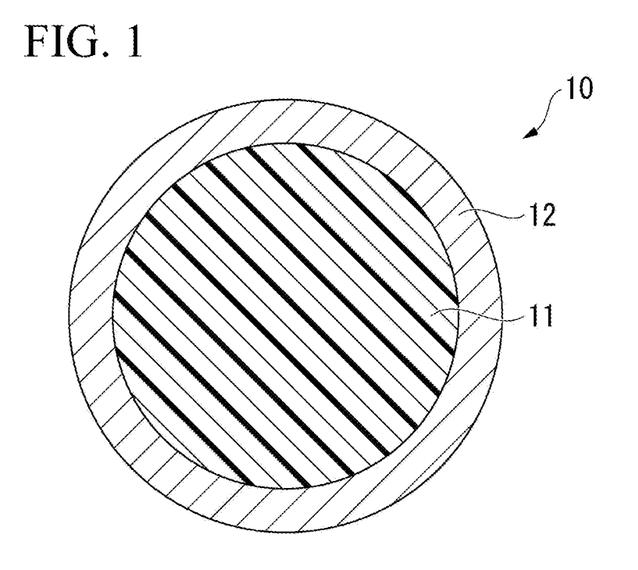
FIG. 1 is a cross-sectional view of a silver-coated resin particle according to an embodiment of the present invention.

FIG. 1 is a cross-sectional view of a silver-coated resin particle according to an embodiment of the present invention.

In FIG. 1, a silver-coated resin particle 10 has a resin particle 11 and a silver coating layer 12 provided on a surface of the resin particle 11. In the silver-coated resin particle 10, an average value of a 10% compressive elastic modulus is in a range of 500 MPa or more and 15,000 MPa or less, and a variation coefficient of the 10% compressive elastic modulus is set to 30% or less.

(Resin Particle)

As the resin particle 11, for example, a silicone resin particle, an aramid resin particle, a fluororesin particle, a polysulfone resin particle, a polyether resin particle, a polyimide resin particle, a polyamide-imide resin particle, an epoxy resin particle, a phenol resin particle, an acrylic resin particle, an acrylic-styrene copolymer particle, a polyurethane particle, and a resin particle having a core-shell structure can be used. As examples of the silicone resin particle, a polysilsesquioxane (PSQ) resin particle and a polymethylsilsesquioxane (PMSQ) resin particle are exemplified. As examples of the aramid resin particle, a polymetaphenylene isophthalamide (MPIA) resin particle and a polyparaphenylene terephthalamide (PPTA) resin particle are exemplified. As examples of the fluororesin resin particle, a polytetrafluoroethylene (PTFE) resin particle, a tetrafluoroethylene-hexafluoropropylene-vinylidene fluoride (THV) resin particle, a polyvinylidene fluoride (PVDF)-based resin particle, a polychlorotrifluoroethylene (PCTFE)-based resin particle, a chlorotrifluoroethylene-ethylene (ECTFE)-based resin particle, a tetrafluoroethylene-ethylene (ETFE)-based resin particle, a tetrafluoroethylene-hexafluoropropylene (FEP)-based resin particle, a tetrafluoroethylene-perfluoroalkyl vinyl ether (PFA)-based resin particle, and the like are exemplified. As examples of the polysulfone resin particle, a polyphenylene sulfide (PPS) resin particle, a polyether-sulfone (PES) resin particle, and the like are exemplified. As examples of the polyether resin particle, a polyether·ether·ketone (PEEK) resin particle, a polyphenylene ether (PPE) resin particle, and the like are exemplified. As examples of the phenol resin particle, a novolac-type phenolic resin particle, a resol-type phenolic resin particle, a phenolic resin obtained by partially modifying a part of the above-described phenolic resin particle, and the like are exemplified. As examples of the polyurethane particle, a polyester-based polyurethane particle, a polyol-based polyurethane particle, and the like are exemplified. As examples of the resin particle having a core-shell structure, a resin particle having an acrylic resin core and a silicone resin shell is exemplified. The resin particle having an acrylic resin core and a silicone resin shell is produced by coating an acrylic resin particle with a silicone resin film.

For the resin particle 11, a 5% by mass-reduction temperature measured by a thermogravimetric analysis is preferably 265° C. or higher. In the present embodiment, the 5% by mass-reduction temperature refers to a temperature at which the initial weight is reduced by 5% by mass at 25° C. when a thermogravimetric analysis is carried out in an inert atmosphere on a resin particle from which moisture physically adsorbed in advance has been dried away at 120° C. There is a concern that the heat resistance of a conductive film formed of a conductive paste including the silver-coated resin particle 10 in which the 5% by mass-reduction temperature of the resin particle 11 is lower than 265° C. as a conductive filler may degrade.

That is, for example, in the case of soldering an electronic component onto the same substrate together with this conductive film, the conductive film is also heated up to a soldering temperature, and, in a case where the 5% by mass-reduction temperature of the resin particle 11 is lower than 265° C., there is a concern that the resin particle 11 may thermally decompose and it may become difficult to maintain the shape of the conductive film.

The shape of the resin particle 11 is not particularly limited. The resin particle 11 may be a spherical particle or may have, instead of a spherical shape, an irregular shape, for example, a flat shape, a plate shape, or a needle shape.

The average particle diameter of the resin particle 11 is preferably in a range of 0.1 µm or more and 30 µm or less and more preferably in a range of 0.5 µm or more and 10 µm or less. In a case where the average particle diameter of the resin particle 11 is less than 0.1 µm, the resin particles 11 easily agglomerate, the surface area of the resin particles 11 becomes large, it is necessary to increase the amount of silver in order to obtain a conductive property required as a conductive filler, and there is a concern that it may become difficult to form a favorable silver coating layer 12. On the other hand, when the average particle diameter of the resin particle 11 exceeds 30 µm, at the time of using the silver-coated resin particle 10 as a conductive filler for a conductive material, a stress is likely to be concentrated on particles having a large particle diameter, and there is a concern that the reliability may be degraded. In the present specification, the average particle diameter of the resin particle 11 refers to an average value calculated from the diameters (particle diameters) of 300 resin particles measured using a scanning electron microscope (manufactured by Hitachi High-Tech Corporation, model name: SU-1500) and software (trade name: PC SEM) at a magnification of 5,000 times. In a case where the resin particle 11 has a non-spherical shape, a value obtained by averaging the long sides of the resin particles 11 is referred to as the average particle diameter.

In addition in the resin particle 11, it is preferable that the variation coefficient of the particle diameter is 30% or less and the particle diameters are uniform. When the variation coefficient of the particle diameter of the resin particle 11 exceeds 30% and the particle diameters are not uniform, there is a concern that the repeatability of imparting a conductive property at the time of using the silver-coated resin particle 10 as a conductive filler may degrade. The variation coefficient (unit: %) of the particle diameter of the resin particle 11 is a value obtained from the standard deviation and the average particle diameter of the above-described 300 resin particles 11 using an expression: [(standard deviation/average particle diameter of particle diameters)×100].

(Silver Coating Layer)

The content of the silver coating layer 12 in the silver-coated resin particle 10, that is, the content of silver in the silver-coated resin particle 10 is preferably in a range of 25% by mass or more and 90% by mass or less and more preferably in a range of 40% by mass or more and 85% by mass or less when the mass of the silver-coated resin particles 10 is set to 100% by mass. When the content of silver is less than 25% by mass, there is a concern that a defect may be generated in the silver coating layer 12. On the other hand, when the content of silver exceeds 90% by mass, the specific gravity of the silver-coated resin particle becomes too large, and there is a concern that it may be difficult to uniformly disperse the silver-coated resin particles in a conductive material such as a TIM or a conductive spacer. In addition, when the content of silver exceeds 90% by mass, the conductive property of the silver coating layer 12 is saturated, and thus there is a concern that it may be industrially disadvantageous to contain silver more than that.

The average particle diameter of the silver-coated resin particle 10 is preferably set in a range of 0.2 µm to 30.5 µm and more preferably set in a range of 0.6 µm to 10.5 µm. This average particle diameter can be measured and calculated by the same method as the average particle diameter of the resin particle 11.

In addition, the thickness of the silver coating layer 12 is preferably in a range of 0.1 μm or more and 0.5 μm or less. When the thickness of the silver coating layer 12 is less than 0.1 μm, at the time of using the silver-coated resin particle 10 as a conductive filler, it becomes difficult to form a contact point between the silver-coated resin particles 10, and there is a concern that a sufficient conductive property cannot be imparted. On the other hand, when the thickness of the silver coating layer 12 exceeds 0.5 there is a concern that the silver-coated resin particle 10 may not easily deform.

(10% Compressive Elastic Modulus)

When the 10% compressive elastic modulus of the silver-coated resin particle 10 is less than 500 MPa, it becomes too easy for the silver-coated resin particle 10 to deform, and the strength of a conductive film, a composite, or the like formed of a conductive material including the silver-coated resin particle 10 as a conductive filler decreases. On the other hand, when the 10% compressive elastic modulus exceeds 15,000 MPa, the silver-coated resin particle 10 does not easily deform, and the relaxation capability for a stress becomes low.

For the above-described reasons, in the present embodiment, the 10% compressive elastic modulus of the silver-coated resin particle 10 is set in a range of 500 MPa or more and 15,000 MPa or less. The average value of the 10% compressive elastic modulus is preferably in a range of 1,000 MPa or more and 15,000 MPa or less and particularly preferably in a range of 5,000 MPa or more and 12,000 MPa or less.

on the resin particle by electroless silver plating.

In addition, in a case where the silver-coated resin particle 10 in which the variation coefficient of the 10% compressive elastic modulus of the silver-coated resin particle 10 exceeds 30% is used as a conductive filler for a conductive film, when a stress is applied to the conductive film, the stress is likely to be concentrated on a specific place in the conductive film, and the conductive film is likely to break.

Therefore, in the present embodiment, the variation coefficient of the 10% compressive elastic modulus of the silver-coated resin particle 10 is set to 30% or less. The variation coefficient is preferably set to 25% or less. The lower limit is not particularly limited and may be 0%.

Here, in the present embodiment, the average value of the 10% compressive elastic modulus of the silver-coated resin particle 10 is an arithmetic average value of the 10% compressive elastic modulus measured from 100 silver-coated resin particles 10. In addition, the variation coefficient (unit: %) of the 10% compressive elastic modulus of the silver-coated resin particle 10 is a value obtained from the arithmetic average value and the standard deviation of the 10% compressive elastic modulus of the above-described 100 silver-coated resin particles 10 using an expression: [(standard deviation of 10% compressive elastic modulus/arithmetic average value of 10% compressive elastic modulus)×100]. The 10% compressive elastic modulus of the silver-coated resin particle 10 is a compressive elastic modulus when the silver-coated resin particle 10 is compressed by 10% in one direction.

[Method for Producing Silver-Coated Resin Particle]

Next, a method for producing the silver-coated resin particle of the present embodiment will be described.

Figure 2:
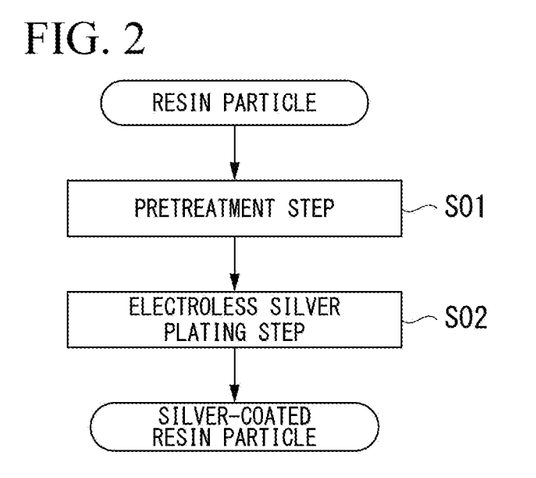
FIG. 2 is a flowchart showing a method for producing the silver-coated resin particle according to the embodiment of the present invention.

FIG. 2 is a flowchart showing a method for producing a silver-coated resin particle according to an embodiment of the present invention. As shown in FIG. 2, the method for producing the silver-coated resin particle according to the present embodiment has a pretreatment step S01 of carrying out a treatment for facilitating the precipitation of silver by electroless plating on a surface of a resin particle that serves as a base particle and an electroless silver plating step S02 of forming a silver coating layer on the resin particle by electroless silver plating.

The resin particle that serves as the base particle preferably has an average value of the 10% compressive elastic modulus in a range of 450 MPa or more and 14,000 MPa or less and a variation coefficient of the 10% compressive elastic modulus of 30% or less. When the average value and the variation coefficient of the 10% compressive elastic modulus of the resin particle are in the above-described ranges, it becomes easy to adjust the average value and the variation coefficient of the 10% compressive elastic modulus of the silver-coated resin particle to the above-described values.

In the resin particle, there is a case where the variation coefficient of the 10% compressive elastic modulus increases due to the degree of crosslinking or polymerization of a resin configuring the particle or the variation in the amount of a monomer or an oligomer remaining in the resin. In a case where the variation of the 10% compressive elastic modulus of the resin particle is large, it is preferable to decrease the variation coefficient of the 10% compressive elastic modulus by decreasing the degree of polymerization of the resin configuring the particle or the variation in the amount of the monomer or the oligomer remaining in the resin with a treatment such as the heating of the resin particle.

(Pretreatment Step)

In the pretreatment step S0I, it is preferable to obtain catalyst-adsorbed resin particles by adsorbing a catalyst to the surfaces of the resin particles or obtain substituted layer-adsorbed resin particles by adsorbing a substituted layer. As the catalyst, palladium or a silver nanoparticle can be used. As a material of the substituted layer, a metal nobler than silver such as tin or a compound thereof can be used.

Palladium catalyst-adsorbed resin particles can be obtained by, for example, adding a palladium compound, hydrochloric acid, and a reducing agent to a slurry in which the resin particles are dispersed and precipitating palladium on the surfaces of the resin particles. As the palladium compound, a complex salt such as palladium chloride, palladium sulfate, palladium nitrate, or a palladium ammine complex salt or the like can be used. As the reducing agent, for example, a salt including a divalent tin ion such as stannous chloride or stannous sulfate, formalin, glucose, imidazole, Rochelle salt (sodium potassium tartrate), hydrazine and a derivative thereof, hydroquinone, L-ascorbic acid or formic acid, or the like can be used.

Tin-substituted layer-adsorbed resin particles can be obtained by, for example, adding a tin compound and hydrochloric acid to a slurry in which the resin particles are dispersed and precipitating, for example, tin hydroxide or the like on the surface of the resin particles. As the tin compound, stannous chloride, stannous fluoride, stannous bromide, stannous iodide, or the like can be used.

If necessary, before carrying out the pretreatment step S01, surface modification may be carried out by a plasma treatment, an ozone treatment, an acid treatment, an alkali treatment, an oxidant treatment, a silane treatment, or the like on the resin particles. This surface modification activates the surface of the resin particles and improves the adhesion between the catalyst or the substituted layer and the silver coating layer and the resin particles.

(Electroless Silver Plating Step)

In the electroless silver plating step S02, a silver coating layer is formed on the catalyst-adsorbed resin particles or the substituted layer-adsorbed resin particles obtained in the pretreatment step S01 by electroless silver plating. As a method of forming the silver coating layer by electroless silver plating, (1) a method in which a slurry is prepared by injecting the catalyst-adsorbed resin particles or the substituted layer-adsorbed resin particles into an aqueous solution including a complexing agent, a reducing agent, and the like, and a silver salt aqueous solution containing an additive metal for increasing the recrystallization temperature (Sn, Cu, Bi, or Sb) or a salt thereof is added dropwise to this slurry, (2) a method in which a slurry is prepared by injecting the catalyst-adsorbed resin particles or the substituted layer-adsorbed resin particles into a silver salt aqueous solution including the additive metal for increasing the recrystallization temperature or a salt thereof and a complexing agent, and a reducing agent aqueous solution is added dropwise to this slurry, and (3) a method in which a slurry is prepared by injecting metal catalyst-adsorbed resin particles into a silver salt aqueous solution including the additive metal for increasing the recrystallization temperature or a salt thereof, a complexing agent, and a reducing agent, and a caustic alkali aqueous solution is added dropwise to this slurry are exemplified.

As the silver salt, silver nitrate, silver dissolved in nitric acid, or the like can be used. As the complexing agent, salts such as ammonia, ethylenediaminetetraacetic acid, ethylenediaminetetraacetic acid tetrasodium, nitrotriacetic acid, triethylenetetraamminehexaacetic acid, sodium thiosulfate, succinate, succinimide, citrate, and an iodide salt can be used. As the reducing agent, formalin, glucose, imidazole, Rochelle salt (sodium potassium tartrate), hydrazine and a derivative thereof, hydroquinone, L-ascorbic acid or formic acid, or the like can be used. As the reducing agent, formaldehyde is preferred, a mixture of two or more kinds of reducing agents including at least formaldehyde is more preferred, and a mixture of reducing agents including formaldehyde and glucose is most preferred.

If necessary, a surface treatment may be carried out on the obtained silver-coated resin particles. As the materials used for the surface treatment, fatty acids such as stearic acid, isostearic acid, palmitic acid, and oleic acid, dicarboxylic acids such as maleic acid and succinic acid, carboxylic acid-based polymers such as polyacrylic acid, amine compounds such as dodecylamine and octadecylamine, amine-based polymers such as polyetheramine, sulfide compounds such as octadecyl disulfide, thiol compounds such as dodecanethiol, a silane coupling agent, and the like are exemplified. When the surface treatment is carried out on the silver-coated resin particles, it is possible to improve the affinity to a binder or the like at the time of using the silver-coated resin particles as a conductive filler in uses described below.

[Uses]

The silver-coated resin particle 10 of the present embodiment is excellent as a conductive filler and can be optimally applied as a conductive filler for, in particular, a conductive adhesive, a conductive film (sheet), a conductive rubber (elastomer), a conductive pressure-sensitive adhesive, a thermal interface material (TIM) such as a heat dissipation sheet or a heat dissipation grease, or a conductive material such as a conductive spacer.

If necessary, a surface treatment may be carried out on the obtained silver-coated resin particles. As the materials used for the surface treatment, fatty acids such as stearic acid, isostearic acid, palmitic acid, and oleic acid, dicarboxylic acids such as maleic acid and succinic acid, carboxylic acid-based polymers such as polyacrylic acid, amine compounds such as dodecylamine and octadecylamine, amine-based polymers such as polyetheramine, sulfide compounds such as octadecyl disulfide, thiol compounds such as dodecanethiol, a silane coupling agent, and the like are exemplified. When the surface treatment is carried out on the silver-coated resin particles, it is possible to improve the affinity to a binder or the like at the time of using the silver-coated resin particles as a conductive filler in uses described below.

[Uses]

The silver-coated resin particle 10 of the present embodiment is excellent as a conductive filler and can be optimally applied as a conductive filler for, in particular, a conductive adhesive, a conductive film (sheet), a conductive rubber (elastomer), a conductive pressure-sensitive adhesive, a thermal interface material (TIM) such as a heat dissipation sheet or a heat dissipation grease, or a conductive material such as a conductive spacer.

(Conductive Adhesive)

The conductive adhesive is classified into an isotropic conductive adhesive (ICA) and an anisotropic conductive adhesive (ACA). In addition, depending on the form of a binder, the conductive adhesive has a paste form, a film form, or an ink form. In the isotropic conductive adhesive, the binder shrinks when the binder is cured, whereby the fillers come into contact with each other in all of the vertical direction, the horizontal direction, and a diagonal direction, and thus the filler comes into contact with a conductive substance to which connection is intended, thereby obtaining a conductive property. It is also possible to form a sheet with the isotropic conductive adhesive. The anisotropic conductive adhesive has a filler dispersed in a binder, and the anisotropic conductive adhesive is sandwiched between conductive substances to which connection is intended. The anisotropic conductive adhesive and the conductive substances to which connection is intended are pressurized in the vertical direction, whereby the filler between the conductive substances to which connection is intended and the conductive substances to which connection is intended come into contact with each other, and a conductive property is obtained. On the other hand, in a portion that is not pressurized, the fillers are disposed in the horizontal direction through the binder, which is an insulator, and do not come into contact with each other, and thus a conductive property is not obtained.

Examples of the conductive adhesive include an anisotropic or isotropic conductive paste, an anisotropic or isotropic conductive ink, and the like. The conductive adhesive is prepared by uniformly mixing the silver-coated resin particle 10 and an insulating binder resin using a kneader such as a planetary mixer or a three-roll mill. In the conductive adhesive, the silver-coated resin particle 10 is uniformly dispersed in the insulating binder resin. The content of the silver-coated resin particle 10 is not particularly limited and is appropriately determined depending on the use or the like, but is preferably in a range of 0.5 to 90 parts by mass with respect to 100 parts by mass of the binder resin.

The insulating binder resin in the conductive adhesive is not particularly limited, and examples thereof include a thermoplastic resin, a composition curing by heat or light such as a curable resin composition, and the like. Examples of the thermoplastic resin include a styrene-butadiene block copolymer, an acrylic resin, an ethylene-vinyl acetate resin, and the like. As the curable resin composition, a resin composition containing an epoxy-based monomer or oligomer having a glycidyl group and a curing agent such as isocyanate is exemplified.

(Conductive Film (Sheet))

As the conductive film, there is an anisotropic or isotropic conductive film formed in a film shape. The conductive film is produced by, first, producing a resin composition containing the silver-coated resin particle 10 dispersed in an insulating binder resin and then applying this resin composition to the surface of a support film such as PET. This resin composition is prepared by uniformly mixing the silver-coated resin particle 10 and the insulating binder resin using a kneader such as a planetary mixer or a three-roll mill. In the conductive film, the silver-coated resin particle 10 is uniformly dispersed in the insulating binder resin on the support film. As the insulating binder resin in the conductive film, a resin composition including a resin such as an acrylic resin, a silicone resin, an epoxy resin, or a phenoxy resin or a mixture thereof as a main component is exemplified. The content of the silver-coated resin particles 10 in the resin composition in the conductive film is not particularly limited and is appropriately determined depending on the use or the like, but is preferably in a range of 0.5 to 90 parts by mass with respect to 100 parts by mass of the binder resin.

(Conductive Rubber (Elastomer))

As the conductive rubber, there is a conductive rubber formed in a sheet shape or a rectangular shape, which can be used as a heat dissipation sheet or a conductive connector. The conductive rubber is produced by vulcanization and forming carried out by, first, kneading a binder rubber, a vulcanizing agent, and the silver-coated resin particle 10 using a biaxial roll or the like and then carrying out heating or pressurization using a heating press or a dryer. As the binder rubber in the conductive rubber, nitrile rubber, acrylic rubber, styrene butadiene rubber, silicone rubber, fluoro-rubber, and the like are exemplified. The content of the silver-coated resin particle 10 in the composition in the conductive rubber is not particularly limited and is appropriately determined depending on the use or the like, but is preferably in a range of 0.5 to 90 parts by mass with respect to 100 parts by mass of the binder rubber.

(Conductive Adhesive)

As the conductive adhesive, there is a conductive pressure-sensitive adhesive or conductive gel formed in a sheet shape or a rectangular shape, which can be used as an electric contact material, a heat dissipation sheet, and an electrode. The conductive pressure-sensitive adhesive is produced by, first, producing a pressure-sensitive adhesive composition containing the silver-coated resin particle 10 dispersed in a pressure-sensitive adhesive that serves as an insulating binder, and then applying the pressure-sensitive adhesive composition to the surface of a support film such as PET. As the binder pressure-sensitive adhesive in the conductive adhesive, an acrylic pressure-sensitive adhesive, a urethane-based pressure-sensitive adhesive, a silicone-based pressure-sensitive adhesive, and the like are exemplified. The content of the silver-coated resin particle 10 in the composition in the conductive pressure-sensitive adhesive is not particularly limited and is appropriately determined depending on the use or the like, but is preferably in a range of 0.5 to 90 parts by mass with respect to 100 parts by mass of the binder pressure-sensitive adhesive.

(Heat Dissipation Grease)

As the heat dissipation grease, there is a grease obtained by mixing a non-volatile base oil and the silver-coated resin particle 10, which can be used as a heat dissipation material. The heat dissipation grease is prepared by uniformly mixing the base oil and the silver-coated resin particle 10 using a kneader such as a planetary mixer or a three-roll mill. As the base oil used for the heat dissipation grease, a silicone oil-based base oil, a mineral oil-based base oil, a synthetic hydrocarbon-based base oil, an ester-based base oil, an ether-based base oil, a glycol-based base oil, a combination thereof, and the like are exemplified. The content of the silver-coated resin particle 10 in the composition in the heat dissipation grease is not particularly limited, and is appropriately determined depending on the use or the like, but is preferably in a range of 0.5 to 90 parts by mass with respect to 100 parts by mass of the base oil.

(Conductive Spacer)

The conductive spacer vertically and electrically connects wiring portions of two upper and lower substrates sandwiching a liquid crystal material in a liquid crystal display device and is used with the gap between the substrates maintained at a predetermined scale. The conductive spacer is produced by, first, adding the silver-coated resin particle 10 to an insulating binder resin such as a thermosetting resin or an ultraviolet-curable adhesive, then, uniformly mixing the silver-coated resin particle 10 and the binder resin with a kneader such as a planetary mixer or a three-roll mill to prepare a resin composition, and then applying the resin composition to any one or both of the wiring portions of the two upper and lower substrates to stick the two substrates together. The content of the silver-coated resin particle 10 is not particularly limited and is appropriately determined depending on the use or and the like, but is preferably in a range of 2 to 10 parts by mass with respect to 100 parts by mass of the binder resin.

In the TIM the conductive spacer including the silver-coated resin particle 10 of the present embodiment, even when a high shear force is applied thereto at the time of kneading the mixture of the silver-coated resin particle 10 and the insulating binder resin, a cleavage or a cracks is not easily generated in the silver coating layer 12 or the silver coating layer 12 does not easily peel from the resin particle 11, and the conductive property thereof further improves. Therefore, in a case where the silver-coated resin particle 10 of the present embodiment is used in, for example, an anisotropic conductive adhesive, it is possible to avid a short circuit of anisotropic conduction (in the horizontal direction), and the reliability improves.

According to the silver-coated resin particle 10 that is the present embodiment configured as described above, the average value of the 10% compressive elastic modulus is in a range of 500 MPa or more and 15,000 MPa or less, the variation coefficient of the 10% compressive elastic modulus is as low as 30% or less, and the variation of the 10% compressive elastic modulus is small, and thus the relaxation capability for a stress is high. Therefore, a conductive material such as a TIM or a conductive spacer including the silver-coated resin particle 10 of the present embodiment has a high strength against a stress.

Hitherto, the embodiment of the present invention has been described, but the present invention is not limited thereto and can be appropriately modified within the scope of the technical concept of the invention.

EXAMPLES

Next, the present invention will be described using examples, but the examples do not limit the present invention.

Present Invention Example 1

(Base Particles)

Spherical acrylic-styrene copolymer particles having an average particle diameter of 3 μm were heated in a vacuum at 250° C. for five hours to adjust the degree of crosslinking of the particles. The acrylic-styrene copolymer particles after the heating had an average value of the 10% compressive elastic modulus of 5,600 MPa and a variation coefficient of 4.5%.

Silver-coated resin particles were produced by the following method using the heated acrylic-styrene copolymer particles as base particles.

(Pretreatment Step)

A stannous chloride aqueous solution was prepared by mixing 10 parts by mass of stannous chloride, 15 parts by mass of hydrochloric acid having a concentration of 35%, and 300 parts by mass of ion-exchanged water. While maintaining the temperature of the prepared stannous chloride aqueous solution at 30° C., 10 parts by mass of the acrylic-styrene copolymer particles were injected into this solution and stirred for one hour to adsorb a tin-substituted layer to the surfaces of the acrylic-styrene copolymer particles. The generated tin-substituted layer-adsorbed acrylic-styrene copolymer particles were collected by filtration and washed with water.

(Electroless Silver Plating Step)

Ten parts by mass of ethylenediaminetetraacetic acid tetrasodium, 15 parts by mass of sodium hydroxide, and 10 parts by mass of a 37% by mass aqueous solution of formaldehyde were added to 500 parts by mass of ion-exchanged water and stirred to prepare an aqueous solution containing a complexing agent and a reducing agent.

In addition, separately, 37 parts by mass of silver nitrate, 30 parts by mass of ammonia water of 25% by mass, and 150 parts by mass of ion-exchanged water were mixed together to prepare a silver nitrate aqueous solution.

Next, 10 parts by mass of the tin-substituted layer-adsorbed acrylic-styrene copolymer particles obtained in the pretreatment step were injected into 535 parts by mass of the aqueous solution containing the complexing agent and the reducing agent to prepare a slurry. Subsequently, while stirring the prepared slurry, 217 parts by mass of the aqueous solution including silver nitrate was added dropwise to the slurry to form a silver coating layer on the surfaces of Sn catalyst-coated acrylic-styrene copolymer base particles, thereby obtaining a silver-coated acrylic-styrene copolymer particle slurry. The obtained slurry was washed with water, filtered, and dried to obtain silver-coated acrylic-styrene copolymer particles.

Present Invention Example 2

(Base Particles)

Particles having a degree of crosslinking adjusted by heating spherical silicone resin particles having an average particle diameter of 4 μm in a nitrogen atmosphere at 350° C. for five hours were used as base particles. The silicone resin particles after the heating had an average value of the 10% compressive elastic modulus of 4,470 MPa and a variation coefficient of 5.8%.

(Pretreatment Step)

Tin-substituted layer-adsorbed silicone resin particles were obtained in the same manner as in Example 1.

(Electroless Silver Plating Step)

Ten parts by mass of the tin-substituted layer-adsorbed silicone resin particles obtained in the pretreatment step were dispersed in 500 parts by mass of ion-exchanged water to prepare a slurry. Next, 6 parts by mass of ethylenediaminetetraacetic acid tetrasodium (complexing agent), 8 parts by mass of a 37% by mass formaldehyde aqueous solution (reducing agent), and 15 parts by mass of D-glucose were added to 510 parts by mass of the prepared slurry and stirred to prepare a tin-substituted layer-adsorbed silicone resin particle slurry including the complexing agent and the reducing agent.

In addition, separately, 30 parts by mass of silver nitrate, 23 parts by mass of ammonia water of 25% by mass, and 150 parts by mass of ion-exchanged water were added thereto to prepare a silver nitrate aqueous solution.

While stirring the tin-substituted layer-absorbed silicone resin particle slurry including the complexing agent and the reducing agent, the silver nitrate aqueous solution was added dropwise to the slurry to form a silver coating layer on the surfaces of the silicone resin particles, thereby obtaining a silver-coated resin particle slurry. The obtained slurry was washed with water, filtered, and dried to obtain silver-coated silicone resin particles.

Present Invention Examples 3 to 12

Silver-coated resin particles were produced in the same manner as in Present Invention Example 1 except that particles shown in Table 1 were used as the base particles, and, in the electroless silver plating step, the blending proportions of tin-substituted layer-adsorbed resin particles, aqueous solutions including a complexing agent and a reducing agent, and silver nitrate aqueous solutions were changed such that the contents of silver in the silver-coated resin particles were, similarly, set to values shown in Table 1.

Comparative Example 1

Styrene resin particles having an average particle diameter of 8 μm, an average value of the 10% compressive elastic modulus of 3,080 MPa, and a variation coefficient of 30.5% were used as the base particles. In addition, silver-coated resin particles were produced in the same manner as in Present Invention Example 1 except that, in the electroless silver plating step, the blending proportions of tin-substituted layer-adsorbed resin particles, an aqueous solution including a complexing agent and a reducing agent, and a silver nitrate aqueous solution were changed such that the content of silver in the silver-coated resin particles reached 45% by mass.

Comparative Example 2

As the base particles, silicone resin particles having an average particle diameter of 4 μm, an average value of the 10% compressive elastic modulus of 4,020 MPa, and a variation coefficient of 42% were used. In addition, silver-coated resin particles were produced in the same manner as in Present Invention Example 1 except that, in the electroless silver plating step, the blending proportions of tin-substituted layer-adsorbed resin particles, an aqueous solution including a complexing agent and a reducing agent, and a silver nitrate aqueous solution were changed such that the content of silver in the silver-coated resin particles reached 75% by mass.

Comparative Example 3

As the base particles, silicone resin particles having an average particle diameter of 2 μm, an average value of the 10% compressive elastic modulus of 5,300 MPa, and a variation coefficient of 27.2% were used. In addition, silver-coated resin particles were produced in the same manner as in Present Invention Example 1 except that, in the electroless silver plating step, the blending proportions of tin-substituted layer-adsorbed resin particles, an aqueous solution including a complexing agent and a reducing agent, and a silver nitrate aqueous solution were changed such that the content of silver in the silver-coated resin particles reached 88% by mass.

Comparative Example 4

As the base particles, polyurethane particles having an average particle diameter of 7 μm, an average value of the 10% compressive elastic modulus of 400 MPa, and a variation coefficient of 10.8% were used. In addition, silver-coated resin particles were produced in the same manner as in Present Invention Example 1 except that, in the electroless silver plating step, the blending proportions of tin-substituted layer-adsorbed resin particles, an aqueous solution including a complexing agent and a reducing agent, and a silver nitrate aqueous solution were changed such that the content of silver in the silver-coated resin particles reached 88% by mass.

[Evaluation]

The following evaluations were carried out on the silver-coated resin particles obtained in the present invention examples and the comparative examples. The results are shown in Table 1 below.

(Content of Silver)

The silver-coated resin particles and dilute nitric acid were mixed together to dissolve the silver coating layer and then filtered to remove the resin particles. The amount of silver in the obtained silver coating layer-dissolved liquid was measured with an inductively coupled plasma emission spectrometer and was converted to the content of silver of the silver-coated resin particles.

(10% Compressive Elastic Modulus)

The 10% compressive elastic modulus of the silver-coated resin particles was calculated as described below.

First, a compression test was carried out on one silver-coated resin particle with a plane indenter under conditions of a load change rate of 0.3 mN/s and 20° C. using a micro-compression tester (manufactured by Fischer Instruments, model No.: HM500), and the displacement and the load when the silver-coated resin particle was compressed by 10% with respect to the major axis were measured. At this time, the measurement start point (zero point) of the displacement was not a point at which the micro-compression tester was recognized to come into contact with the silver-coated resin particle, but a point at which the micro-compression tester changed the load imparted to the silver-coated resin particle. Next, the measured displacement and load were substituted into the following (1) to calculate the 10% compressive elastic modulus. The compression test was carried out on 100 silver-coated resin particles, and the 10% compressive elastic modulus of each of the particles was calculated. In addition, the average value of the 10% compressive elastic modulus and the variation coefficient were obtained.

$$10\% \text{ compressive elastic modulus [MPa]} = 3F/(2S^3R)^{1/2} \quad \text{Expression (1)}$$

F: Load [N] when the silver-coated resin particle was compressed by 10%

S: Displacement [mm] when the silver-coated resin particle was compressed by 10%

R: Radius [mm] of the silver-coated resin particle before compression (Tensile Test of Silver-Coated Resin Particle-Containing Resin Film)

A silver-coated resin particle-containing resin film was produced as described below.

An epoxy resin composition and the silver-coated resin particles were weighed such that the ratio between the cured epoxy resin composition and the silver-coated resin particles reached 60:40 in terms of the volume ratio. Next, the weighed epoxy resin composition and silver-coated resin particles were mixed together using a rotation and revolution mixer and then kneaded using a three-roll mill to prepare a silver-coated resin particle-containing epoxy resin composition paste. As the thermosetting epoxy resin composition, a composition having an elongation at break of 10% when cured in a pure state was used.

The prepared silver-coated resin particle-containing epoxy resin composition paste was applied to a TEFLON (registered trademark) plate using an applicator and then heated under conditions of 150° C. for 2 hours to cure a silver-coated resin particle-containing epoxy resin composition. The cured silver-coated resin particle-containing epoxy resin composition was peeled off from the TEFLON plate, and 50 test films for a tensile test were produced based on the method described in JIS K 7161 (Plastics-Determination of tensile properties (Part 1: General principles)).

A tensile test was carried out using a universal testing machine (manufactured by Shimadzu Corporation, AUTOGRAPH) by a method based on the method described in JIS K7161, and a strain when the test film broke was calculated. For the 50 test films, strain when the test films broke was measured, and the proportion of test films having a strain at break of 1.0% or less was calculated.

TABLE 1

| | Base particle | | | | | Evaluation of silver coating layer particle | | |
|---|---|---|---|---|---|---|---|---|
| | | | | 10% compressive elastic modulus | | | 10% compressive elastic modulus | | Proportion (%) of |
| | Material | Shape | Average particle diameter (μm) | Average value (MPa) | Variation coefficient (%) | Content of silver (% by mass) | Average value (MPa) | Variation coefficient (%) | test films having strain at break of 1.0% or less |
| Present Invention Example 1 | Acrylic-styrene copolymer | Spherical shape | 3 | 5600 | 4.5 | 70 | 9900 | 4.1 | Less than 2% |
| Present Invention Example 2 | Silicone resin | Spherical shape | 4 | 4470 | 5.8 | 65 | 8200 | 7.2 | 2 |
| Present Invention Example 3 | Silicone resin | Spherical shape | 2 | 5500 | 22.4 | 82 | 11980 | 20.1 | 4 |
| Present Invention Example 4 | Novolac-type phenolic resin | Spherical shape | 7 | 4810 | 16.8 | 45 | 5010 | 18.1 | 4 |

TABLE 1-continued

| | Base particle | | | | | | Evaluation of silver coating layer particle | | |
|---|---|---|---|---|---|---|---|---|---|
| | | | | 10% compressive elastic modulus | | | 10% compressive elastic modulus | | Proportion (%) of |
| | Material | Shape | Average particle diameter (μm) | Average value (MPa) | Variation coefficient (%) | Content of silver (% by mass) | Average value (MPa) | Variation coefficient (%) | test films having strain at break of 1.0% or less |
| Present Invention Example 5 | Polyurethane particle | Spherical shape | 5 | 480 | 9.8 | 50 | 520 | 9.9 | 4 |
| Present Invention Example 6 | Silicone resin | Spherical shape | 0.8 | 9840 | 28.6 | 85 | 14800 | 28.8 | 6 |
| Present Invention Example 7 | Epoxy resin particle | Spherical shape | 8 | 8800 | 26.5 | 60 | 10100 | 30 | 8 |
| Present Invention Example 8 | Polyimide resin particle | Spherical shape | 7 | 6590 | 18.8 | 60 | 9210 | 19.5 | 6 |
| Present Invention Example 9 | Acrylic resin | Spherical shape | 10 | 1050 | 8.1 | 45 | 2430 | 9.2 | 4 |
| Present Invention Example 10 | Acrylic resin | Spherical shape | 30 | 2530 | 8.5 | 35 | 2600 | 9.3 | 4 |
| Present Invention Example 11 | Styrene resin | Spherical shape | 3 | 5040 | 28.2 | 80 | 12100 | 28.8 | 6 |
| Present Invention Example 12 | Silicone resin | Spherical shape | 0.8 | 9840 | 28.6 | 86 | 15000 | 29.2 | 8 |
| Comparative Example 1 | Styrene resin | Spherical shape | 8 | 3080 | 30.5 | 45 | 4100 | 32 | 14 |
| Comparative Example 2 | Silicone resin | Spherical shape | 4 | 4020 | 42 | 75 | 7650 | 52 | 20 |
| Comparative Example 3 | Silicone resin | Spherical shape | 2 | 5300 | 27.2 | 88 | 15200 | 28 | 14 |
| Comparative Example 4 | Polyurethane particle | Spherical shape | 7 | 400 | 10.8 | 88 | 450 | 12 | 12 |

In the silver-coated resin particle-containing epoxy resin compositions including the silver-coated resin particles of Comparative Examples 1 and 2 in which the variation coefficient of the 10% compressive elastic modulus exceeded the scope of the present invention, the proportions of the test films having a strain at break after curing of 1.0% or less increased. This is considered to be because the variation coefficient of the 10% compressive elastic modulus of the silver-coated resin particles became too large, and thus the silver-coated resin particles did not uniformly deform when the stress was imparted thereto, and the relaxation capability of the silver-coated resin particles degraded.

In addition, in the silver-coated resin particle-containing epoxy resin composition including the silver-coated resin particles of Comparative Example 3 in which the average value of the 10% compressive elastic modulus exceeded the scope of the present invention, the proportions of the test films having a strain at break after curing of 1.0% or less increased. This is considered to be because the 10% compressive elastic modulus of the silver-coated resin particles became too large, and thus the relaxation capability of the silver-coated resin particles degraded.

In contrast, in the silver-coated resin particle-containing epoxy resin compositions including the silver-coated resin particles of Present Invention Examples 1 to 12 in which the average value of the 10% compressive elastic modulus and the variation coefficient were in the scope of the present invention, the proportions of the test films having a strain at break after curing of 1.0% or less decreased. This is considered to be because the relaxation capability of the silver-coated resin particles was high.

From the above-described facts, it was confirmed that, according to the present invention, it becomes possible to provide a silver-coated resin particle having a high relaxation capability for a stress.

INDUSTRIAL APPLICABILITY

According to the present invention, it becomes possible to provide a silver-coated resin particle having a high relaxation capability for a stress.

REFERENCE SIGNS LIST

10 Silver-coated resin particle
11 Resin particle
12 Silver coating layer

What is claimed is:
1. A silver-coated resin particle comprising:
a resin particle; and
a silver coating layer provided on a surface of the resin particle,
wherein an average value of 10% compressive elastic modulus is in a range of 500 MPa or more and 15,000 MPa or less,
a variation coefficient of the 10% compressive elastic modulus is greater than or equal to 4.1% and 30% or less,
a content of silver in the silver-coated resin particle is in a range of 35% by mass or more and 86% by mass or less when the mass of the silver-coated resin particles is set to 100% by mass, and
a proportion of test films having strain at break of 1.0% or less, which are provided and measured based on the method described in JIS K 7161, is 8% or less, and
wherein the silver coating layer is provided directly on the surface of the resin particle, and wherein the resin particle has a solid-core.
2. The silver-coated resin particle according to claim 1, wherein the resin particle is any of a silicone resin particle, an aramid resin particle, a fluororesin particle, a polysulfone resin particle, a polyether resin particle, a polyimide resin particle, a polyamide-imide resin particle, an epoxy resin particle, a phenol resin particle, an acrylic resin particle, an acrylic-styrene copolymer particle, a polyurethane particle, and a resin particle having a core-shell structure.

3. The silver-coated resin particle according to claim 2, wherein an average particle diameter of the resin particle is in a range of 0.1 μm or more and 30 μm or less.

4. The silver-coated resin particle according to claim 1, wherein an average particle diameter of the resin particle is in a range of 0.1 μm or more and 30 μm or less.

5. A silver-coated resin particle comprising:
a resin particle; and
a silver coating layer provided on a surface of the resin particle,
wherein an average value of 10% compressive elastic modulus is in a range of 500 MPa or more and 15,000 MPa or less,
a variation coefficient of the 10% compressive elastic modulus is greater than or equal to 4.1% but 30% or less, and
a content of silver in the silver-coated resin particle is in a range of 35% by mass or more and 86% by mass or less,
wherein the resin particle is at least one selected from the group consisting of a silicone resin particle, an aramid resin particle, a fluororesin particle, a polysulfone resin particle, a polyether resin particle, a polyimide resin particle, a polyamide-imide resin particle, an epoxy resin particle, a phenol resin particle, an acrylic resin particle, an acrylic-styrene copolymer particle, a polyurethane particle, and a resin particle having an acrylic resin core and a silicone resin shell, and
wherein the silver coating layer is provided directly on the surface of the resin particle, and wherein the resin particle has a solid-core.

* * * * *